US006380932B1

(12) United States Patent
Kawasaki et al.

(10) Patent No.: US 6,380,932 B1
(45) Date of Patent: *Apr. 30, 2002

(54) LIQUID CRYSTAL DISPLAY DEVICE

(75) Inventors: Yuji Kawasaki; Jun Koyama, both of Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/010,482

(22) Filed: Jan. 21, 1998

Related U.S. Application Data

(62) Division of application No. 08/447,932, filed on May 23, 1995, now Pat. No. 5,812,149.

(30) Foreign Application Priority Data

May 24, 1994 (JP) .............................. 6-133634

(51) Int. Cl.[7] .............................. G09G 5/00; G09G 3/36
(52) U.S. Cl. .................. 345/213; 345/87; 345/102; 345/98; 348/715
(58) Field of Search ................... 345/211–215, 204, 345/520, 521, 87, 90, 102, 98; 348/715

(56) References Cited

U.S. PATENT DOCUMENTS

| 4,964,699 A | 10/1990 | Inoue ........................ 350/332 |
| 5,289,173 A | 2/1994 | Numao ........................ 345/87 |
| 5,313,225 A | 5/1994 | Miyadera .................... 345/102 |
| 5,374,941 A | 12/1994 | Yuki et al. .................... 345/97 |
| 5,379,051 A | 1/1995 | Suga et al. ................... 345/97 |
| 5,483,634 A | 1/1996 | Hasegawa .................... 395/162 |
| 5,574,483 A | 11/1996 | Nishizawa ................... 345/200 |
| 5,583,534 A | 12/1996 | Katakura et al. | |
| 5,589,848 A | 12/1996 | Shimizu ...................... 345/102 |
| 5,606,343 A | 2/1997 | Tsuboyama et al. .......... 345/97 |
| 5,812,149 A | * 9/1998 | Kawasaki et al. ........... 345/516 |

FOREIGN PATENT DOCUMENTS

| EP | 0 533 472 | 3/1993 |
| EP | 0 573 174 | 12/1993 |

* cited by examiner

Primary Examiner—Bipin Shalwala
Assistant Examiner—Jimmy H. Nguyen
(74) Attorney, Agent, or Firm—Eric J. Robinson; Nixon Peabody LLP

(57) ABSTRACT

In a liquid crystal display (LCD) device, two continuous frame image data to be displayed on a display unit are compared with each other by a comparator circuit, and horizontal and vertical synchronizing signals are regulated in accordance with a comparison result. That is, when the two frame image data coincide with each other, the horizontal and vertical synchronizing signals are not output to the display unit through the controller, in order to decrease the number of scannings of frames to be displayed. Also, when the LCD device has a backlight unit and two frame image data coincide with each other, the backlight unit is turned off.

25 Claims, 8 Drawing Sheets

LIQUID CRYSTAL DISPLAY DEVICE

This application is a division of Ser. No. 08/447,932 filed May 23, 1995, now U.S. Pat. No. 5,812,149.

BACKGROUND OF THE INVENTION

The present invention relates to a liquid crystal display device capable of reducing a consumption power.

As shown in FIG. 2, a liquid crystal display (LCD) controller 203 is connected with an LCD unit 205, an image data memory 202, a micro-processing unit (MPU) 201 and a synchronizing signal generator circuit 204. Under commands of MPU 201, image data stored in the image data memory 202 is input to the LCD controller 203 and is signal-converted, so that the converted image data is displayed on the LCD unit 205.

In a conventional LCD controller, when the same (frame) image data is displayed on the LCD unit for a long time, (1) the display is continued, or (2) after an input interruption from a keyboard a mouse or the like is monitored and a desired period of time elapses, driving of a liquid crystal is stopped after the displayed image data is restored in the memory, or a backlight unit is turned off.

In the same frame image display for a long time, a method other than an image data restorage to the memory and a turning off of a backlight unit does not provide power saving of an LCD unit. Therefore, a frame image storage method for providing power saving without using unnecessary memories is desired. Also, since a backlight unit is not always included in all LCD devices, a method for providing power saving in a case wherein the same frame image is displayed for a long time, other than turning off of the backlight unit, is desired.

SUMMARY OF THE INVENTION

The object of the present invention is to solve the above problem.

According to the present invention, a liquid crystal display device of FIG. 1 includes, a micro-processing unit (MPU) 101 for controlling a whole peripheral circuit, an image data memory 102 capable of storing two frame image data, an image data arranging circuit 103 for arranging two frame image data, an image data comparator circuit 104 capable of comparing two frame image data in bit units, a timer circuit 106, a liquid crystal display (LCD) unit 110, an LCD controller 107 for controlling the LCD unit 110, a synchronizing signal generator circuit 109 for generating synchronizing signals (vertical and horizontal synchronizing signals), and a synchronizing signal regulating circuit 108 for regulating vertical and horizontal synchronizing signals in accordance with an output signal from the circuit 104. An output signal from the circuit 108 is input to the LCD controller 107, to control synchronizing signals to the LCD unit 110.

In the above structure, a peripheral circuit in an LCD device represents a circuit having a function for driving a display portion constructing the LCD unit. The display portion in the LCD device has a structure which pixels constructed by a liquid crystal arranged between at least one pair of electrodes are arranged at a matrix form. As a structure of the display portion, there is two types. One is a simple matrix type, and the other is an active matrix type.

Basically, an LCD unit includes analog buffers for driving each liquid crystal pixel arranged at a matrix form, analog memories for storing images to be displayed, and shift registers for generating operation timings of a matrix circuit in an X and Y directions. Also, a peripheral circuit in the LCD device includes an LCD controller for supplying data and clocks for the shift registers of X and Y directions to the LCD unit, a synchronizing signal generating circuit for supplying horizontal and vertical synchronizing signals and timing signals to the LCD controller, and an image data memory for storing images to be displayed.

The above structure can be used in a simple matrix type or an active matrix type LCD device. A liquid crystal material to be used is not limited to a specific material.

A memory element capable of storing two frame image data has a function for storing two frame image data necessary to display two frames. As the memory element, a video random access memory (VRAM) is used. The VRAM is of a dynamic random access memory (DRAM) and has normal parallel input and output ports, and further serial input and output ports.

Two frame image data stored in the image data memory 102 are compared with each other in bit units by the image data comparator circuit 104, and then the circuit 104 outputs an output signal representing a comparison result. In accordance with the output signal, the synchronizing signal regulator circuit 108 regulates horizontal and vertical synchronizing signals and supplies the regulated horizontal and vertical synchronizing signals to the LCD controller 107.

In a case wherein the same frame is displayed for a long time, if the number of scannings on a display portion (screen) of the LCD device is decreased, a consumption power can be reduced.

A time to decrease the number of scannings is set by the timer circuit 106, time interval that characteristics of a liquid crystal does not deteriorate without applying an alternating voltage to a liquid crystal in an LCD device, a refreshing time of a memory for storing image data in a peripheral circuit of the LCD device, or a refreshing time of an analog memory included in the LCD unit can be selected and set.

DETAILED DESCRIPTION OF THE PREFERRED EMBODIMENTS

Embodiment 1

Figure 3:
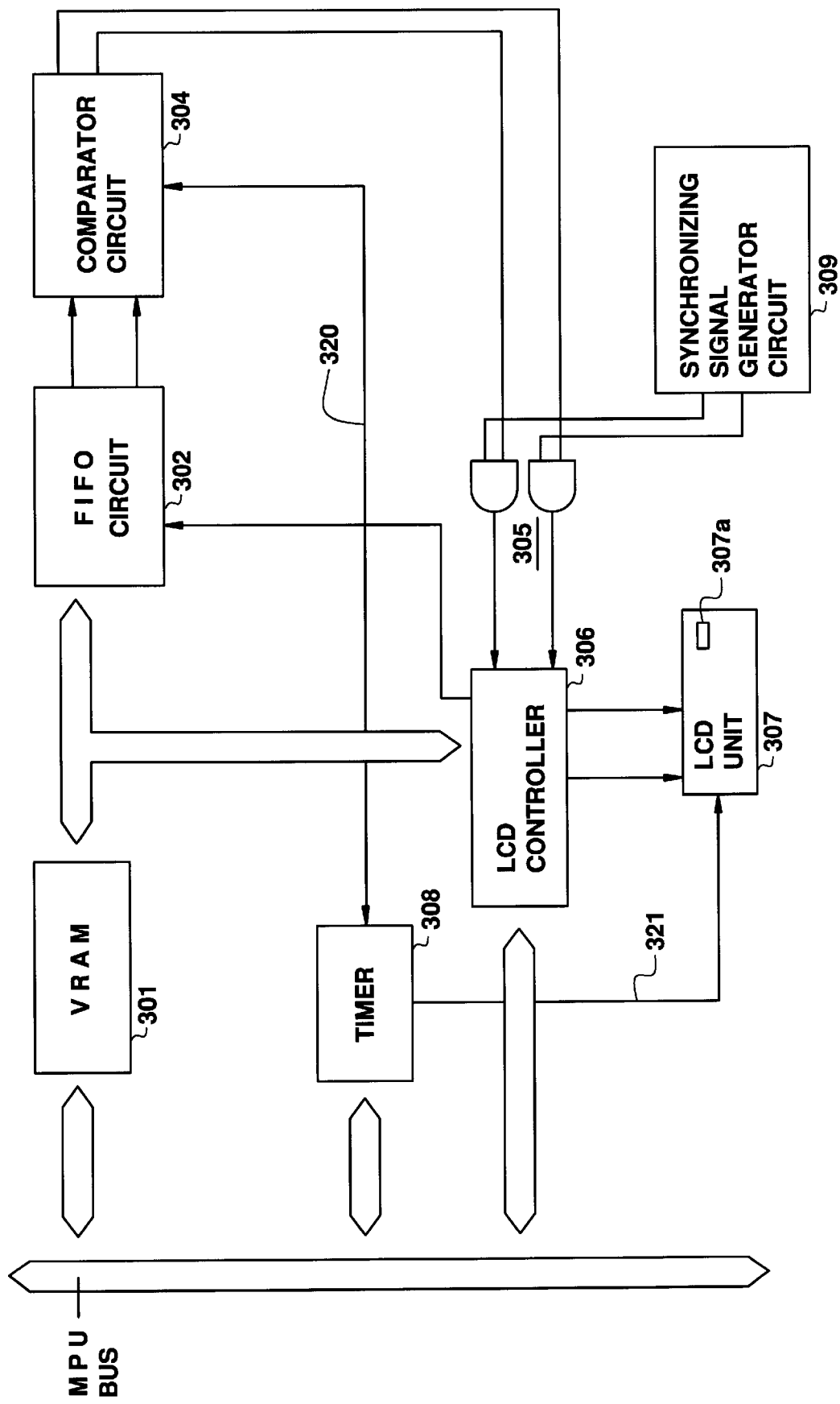
FIG. 3 shows a block diagram of an LCD device according to another embodiment.

In a peripheral circuit for a liquid crystal display (LCD) device as shown in FIG. 3, a video random access memory (VRAM) 301 is used as an image data memory element, an image data arranging circuit is constructed by a first in first out (FIFO) circuit 302, an image data comparator circuit is constructed by a comparator circuit 304, and a synchronizing signal regulator circuit is constructed by AND circuits 305. Further, the LCD device includes an LCD controller 306, an LCD unit 307 having a backlight unit 307a, a timer 308 including a counter (not shown), and a synchronizing signal generator circuit 309.

An operation of the device of FIG. 3 is described below.

The LCD controller 306 performs image data read to the VRAM 301. Image data read out from the VRAM 301 is input to the FIFO circuit 302.

Figure 4:
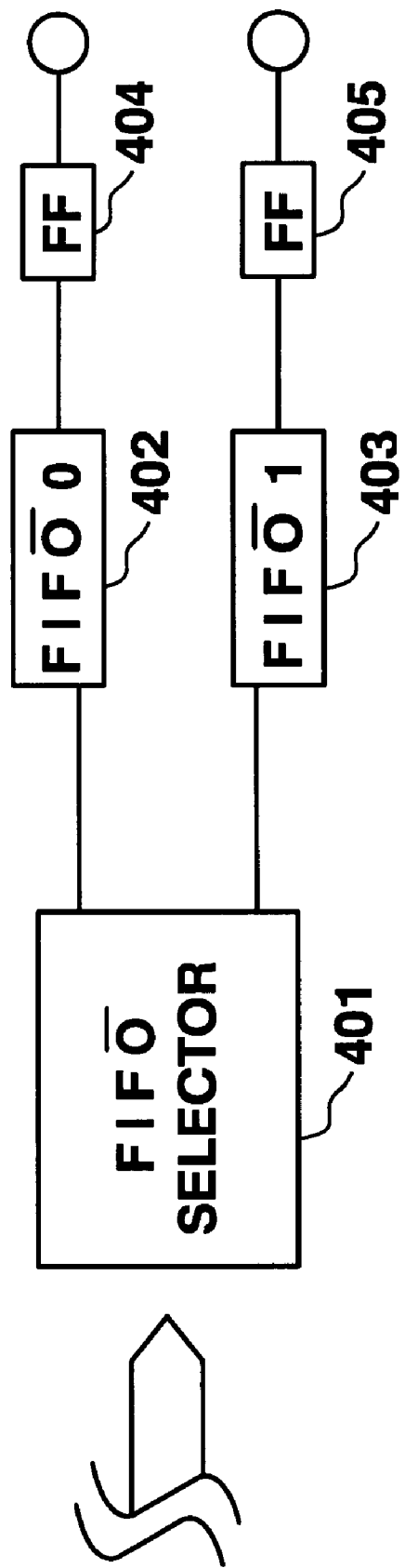
FIG. 4 shows a block diagram of an image data arranging circuit in the LCD device of FIG. 3.

FIG. 4 shows a structure of the FIFO circuit 302. The FIFO circuit 302 is constructed by an FIFO selector 401, FIFO0 402 and FIFO1 403, and flipflop (FF) circuits 404 and 405. The FIFO selector 401 switches to store the first frame into the FIFO0 402 and store the second (next) frame into the FIFO1 403. When data is input to the FIFO1 403, the FIFO0 402 and the FIFO1 403 are set to obtain an enable state with respect to data output. Data from the FIFO0 402 and the FIFO1 403 are synchronized and output from the flipflop circuits 404 and 405 in accordance with a standard clock.

Figure 5:
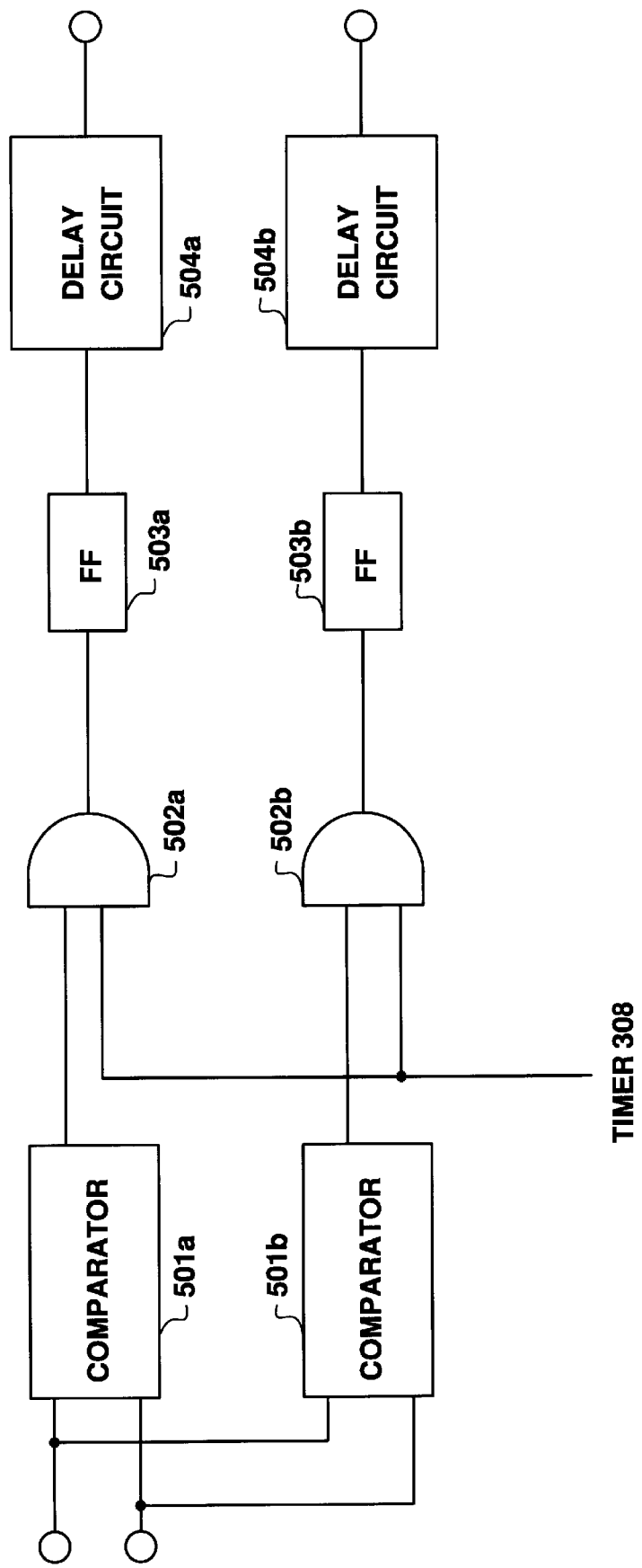
FIG. 5 shows a block diagram of an image data comparator circuit in the LCD device of FIG. 3.

Output data signal from the FIFO circuit 302 is input to the comparator circuit 304 as shown in FIG. 5. The comparator circuit 304 includes two comparators 501a and 501b, two AND (gate) circuits 502a and 502b, two flipflop (FF) circuits 503a and 503b, and delay circuits 504a and 504b for delaying a comparator circuit output. Each two circuits are used to regulate horizontal and vertical synchronizing signals. The delay circuit 504a and 504b are used to output signals in synchronous with a standard clock, to prevent an element delay or the like in a case wherein a comparison result of two frame images is output accurately.

Image data signals in bit units with respect to two frame images are compared with each other by the comparators 501a and 501b. The AND circuits 502a and 502b output a low level (L) signal when the two image data signals coincide with each other, and output a high level (H) signal when the two image data signals are different from each other. The two output signals are synchronized with a standard clock by the flipflop circuits 503a and 503b and are output through the delay circuits 504a and 504b. Therefore, in the comparator circuit 304, two frame images are compared with each other and a level representing whether or not the two frame images coincide with each other can be determined.

Output signals from the comparator circuit 304 are input to a synchronizing signal regulator circuit 305 constructed by the AND circuits. As shown in FIG. 3, in the AND circuits 305, an AND logic operation is performed between the output signals from the circuit 304 and the horizontal and vertical synchronizing signals from the synchronizing signal generator circuit 309.

As described above, when two image data signals coincide with each other, a low level (L) signal is output from the comparator circuit 304. Therefore, when an AND logic operation is performed in the AND circuits 305, the horizontal and vertical synchronizing signals are not output from the AND circuits 305 to the LCD controller 306. Only vertical synchronizing signal may be not output.

On the other hand, when the two image data signals are different from each other, a high level (H) signal is output from the comparator circuit 304. Therefore, when an AND logic operation is performed in the AND circuits 305, the horizontal and vertical synchronizing signals are output from the AND circuits 305 to the LCD controller 306.

In either of the above states, the horizontal and vertical synchronizing signals are input to the LCD unit 307 through the LCD controller 306.

When two image data coincide with each other, the timer 308 starts count and horizontal and vertical synchronizing signals are maintained at the same state until a count value of the timer 308 reaches a set value. The timer 308 is connected with the comparator circuit 304 through an interruption signal line 320. When the count value of the timer 308 reaches the set value, an interruption signal output from the timer 308 changes an output signal level of the comparator circuit 304 into a high level (H).

Also, when two image data coincide with each other, since the timer 308 is connected with the LCD unit 307 through a backlight unit switch line 321, the timer 308 outputs a signal (having a level for turning off a backlight unit 307a) to the backlight unit switch line 321 after a count value of the timer 308 reaches an initial set value, so that the backlight unit 307a of the LCD unit 307 can be turned off. When the timer 308 is reset, the level of the signal on the backlight unit switch line 321 is held to a level for turning on the backlight unit 307a.

By the above operations, when the same frame images are continuous, turning on and off of the backlight unit 307a can be controlled.

Embodiment 2

Figure 1:
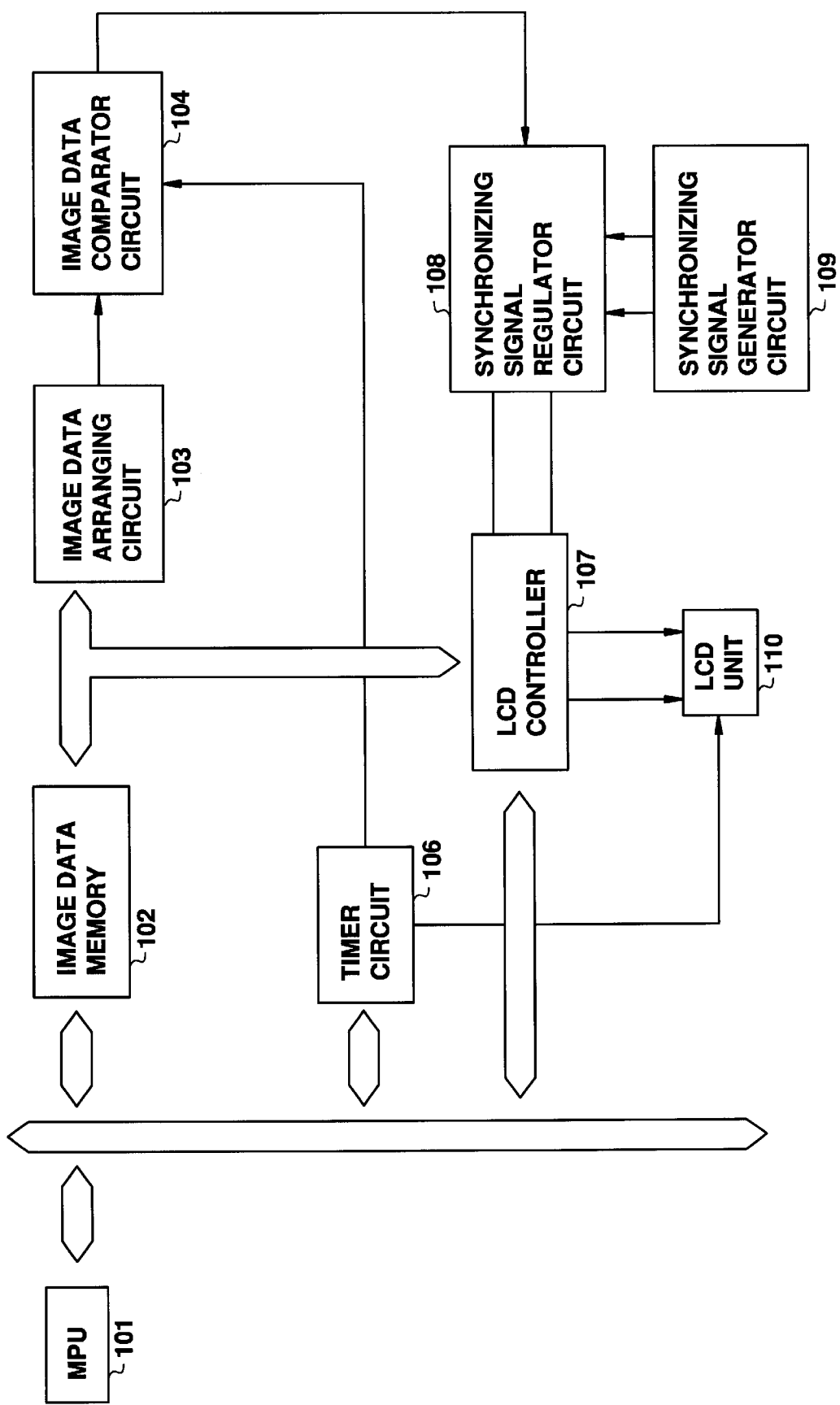
FIG. 1 shows a block diagram of a liquid crystal display (LCD) device according to an embodiment of the present invention.
Figure 2:
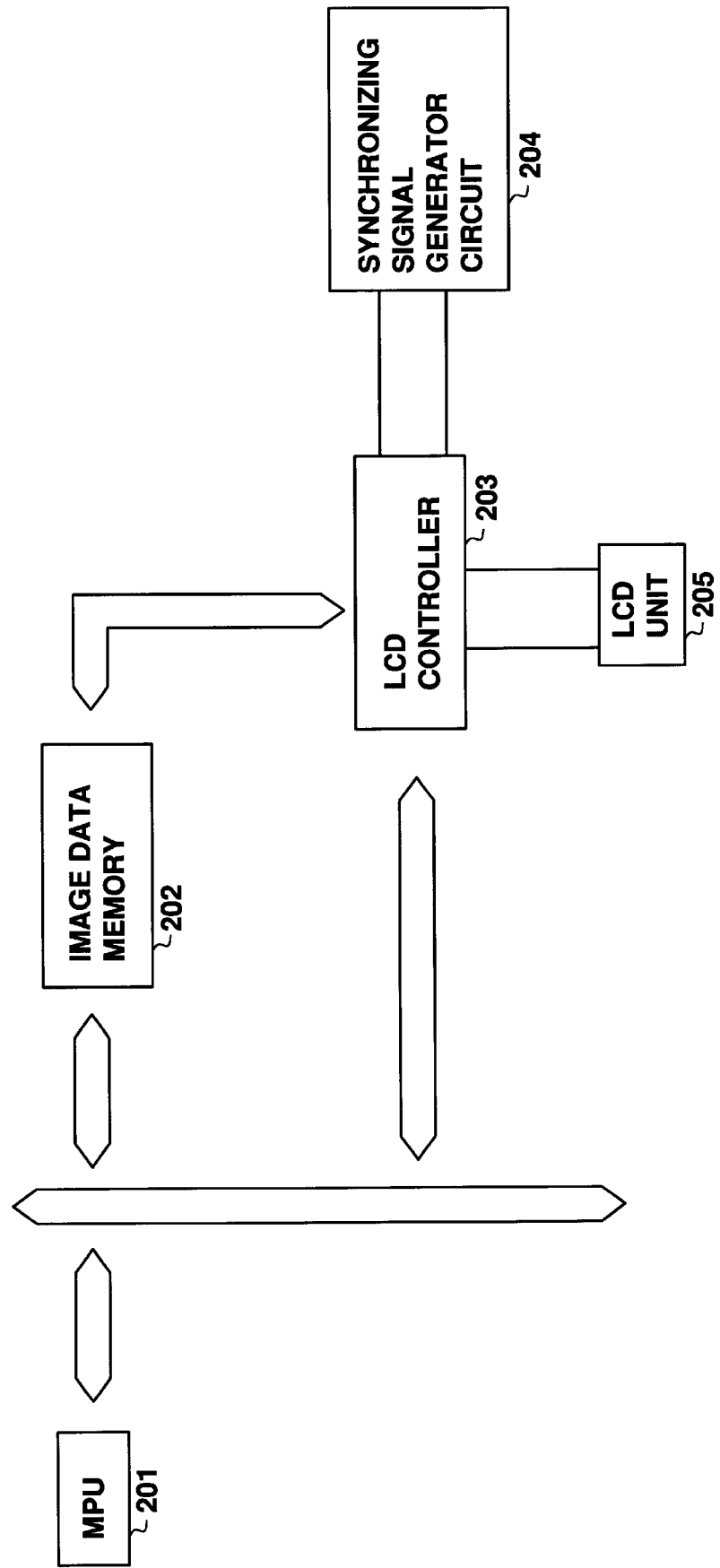
FIG. 2 shows a block diagram of a convention LCD device.
Figure 6:
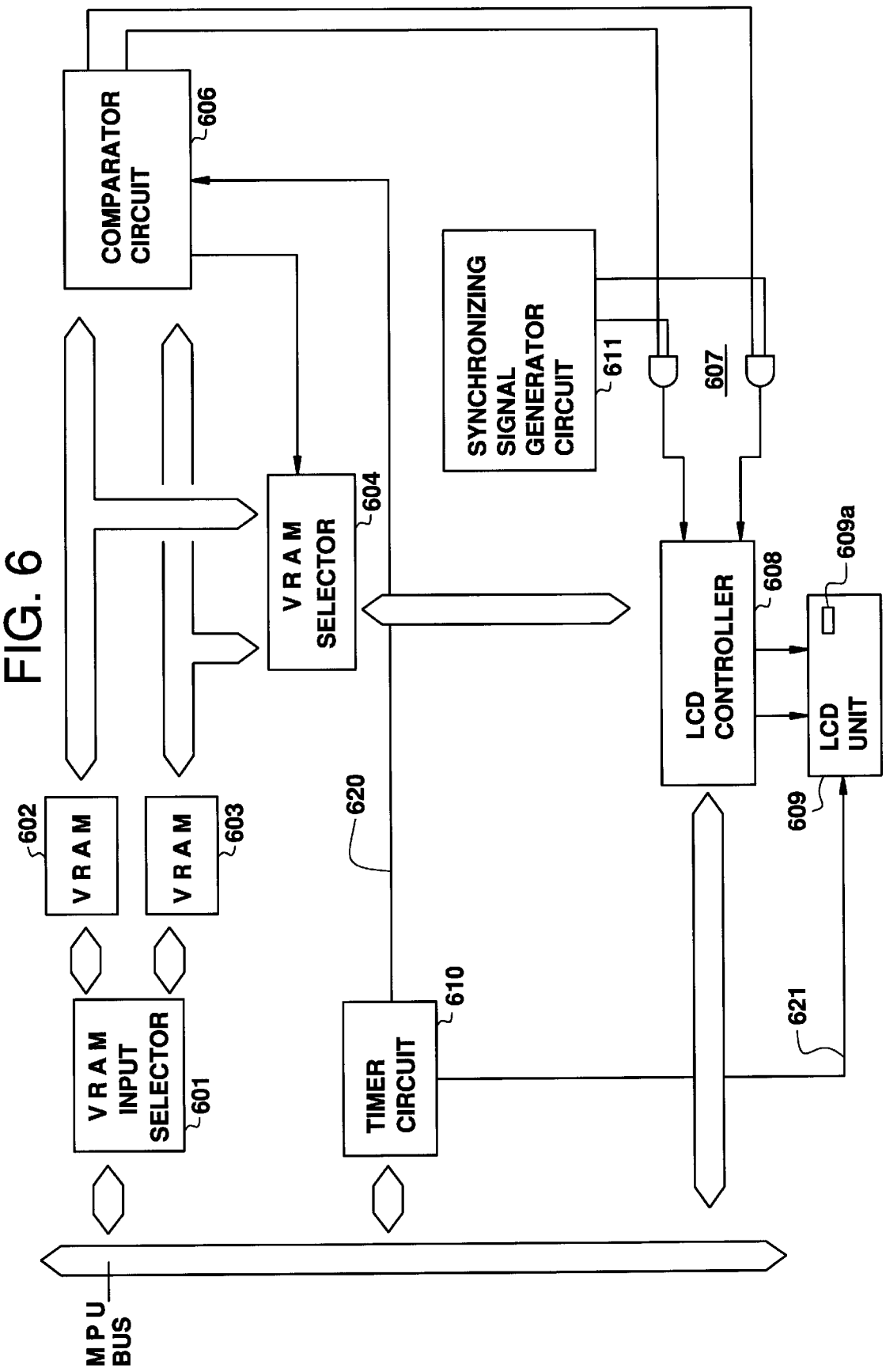
FIG. 6 shows a block diagram of an LCD device according to another embodiment.
Figure 7:
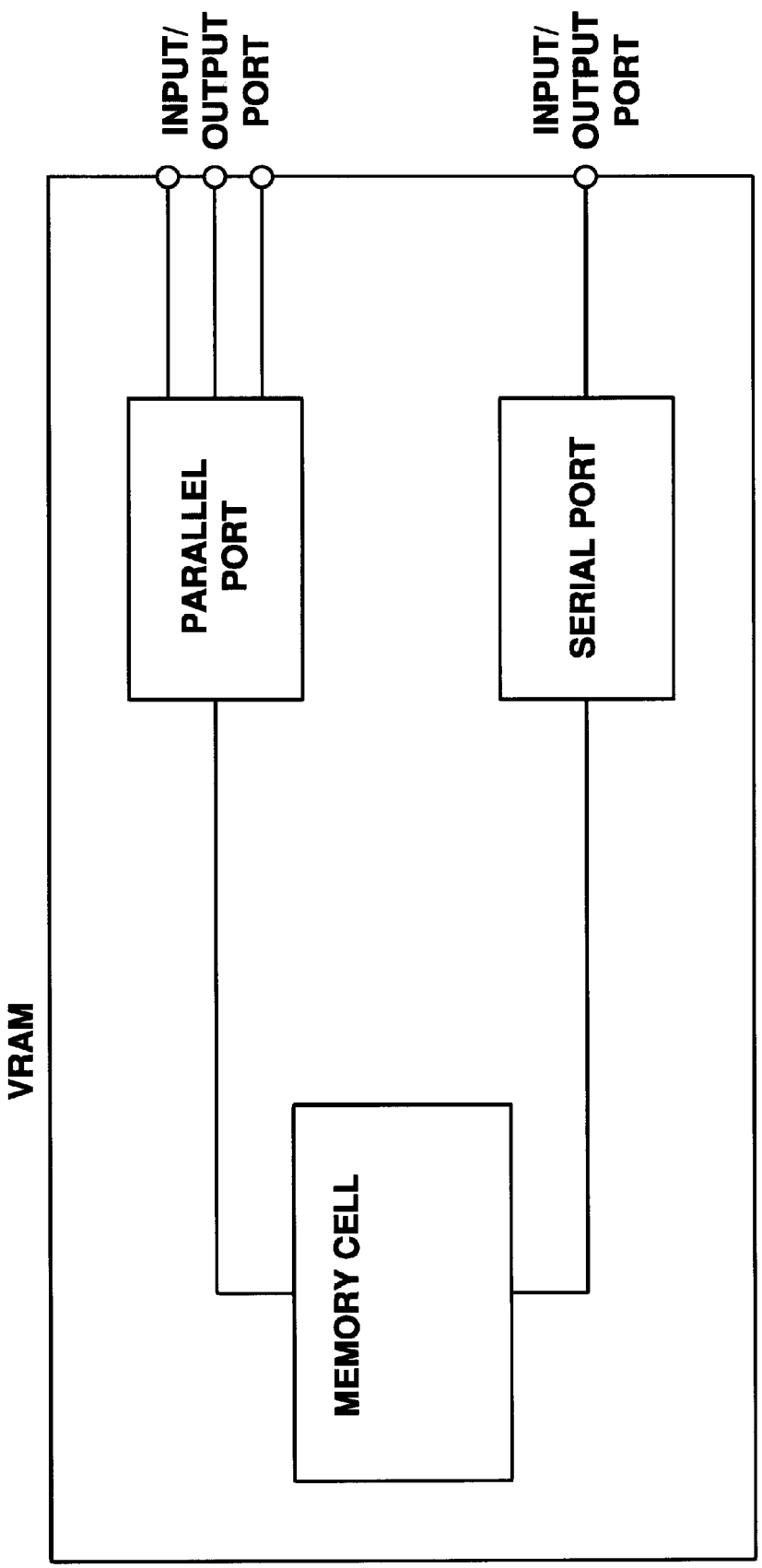
FIG. 7 shows a block diagram of a VRAM according to another embodiment.
Figure 8:
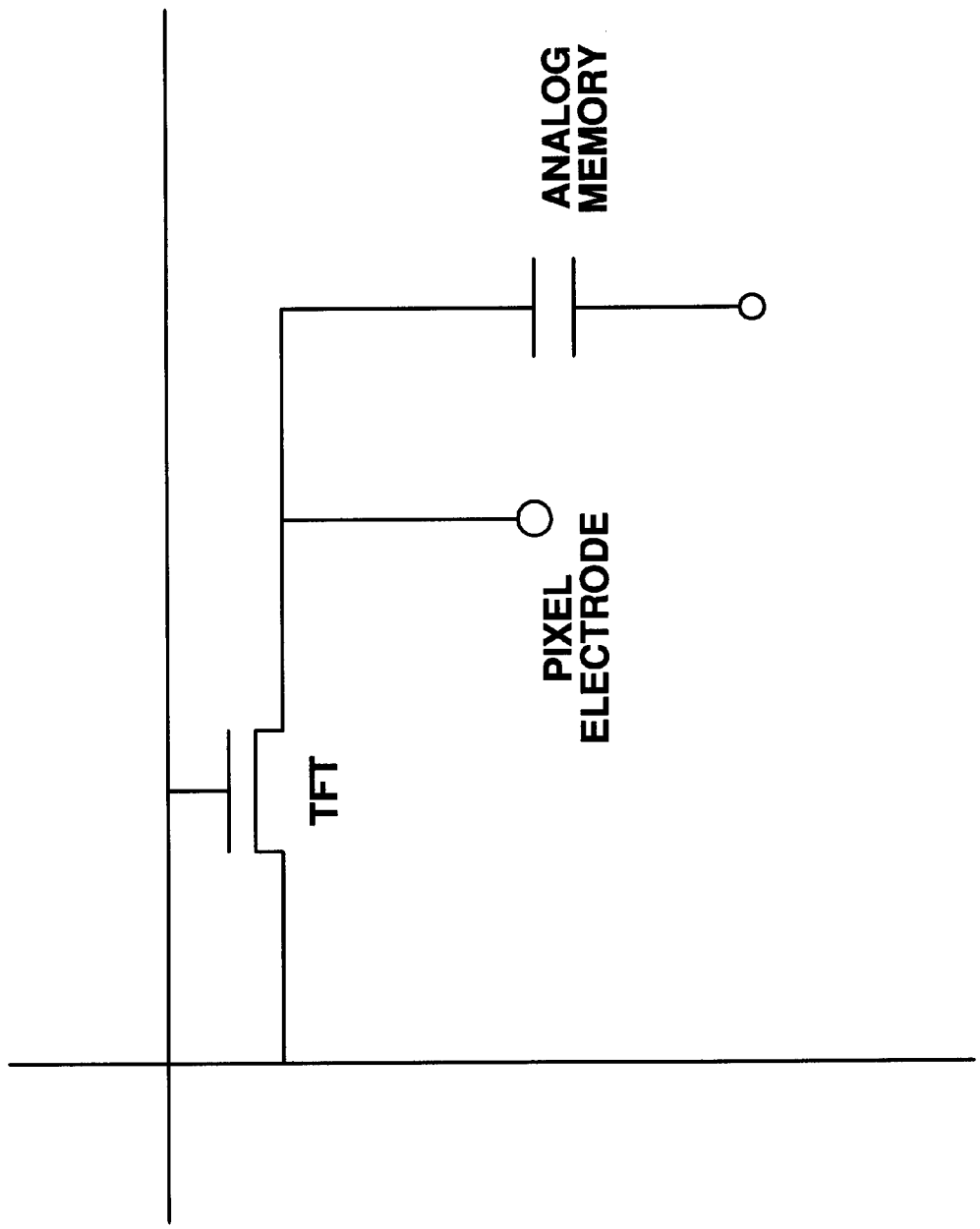
FIG. 8 shows a circuit diagram of according to another embodiment.

In FIG. 6, VRAMs 602 and 603 are arranged as an image data memory element, and the first frame image and the second (next) frame image are stored in the VRAMs 602 and 603, respectively, by a VRAM input selector 601 for selecting the VRAM 602 and 603. Since the VRAMs 602 and 603 are used in an LCD device of FIG. 6, the image data arranging circuit of FIG. 1 is not necessary. The image data comparator circuit is constructed by a comparator circuit 606, and the synchronizing signal regulator circuit is constructed by AND (gate) circuits 607. Further, the LCD device includes a VRAM output selector 604, an LCD controller 608, an LCD unit 609 having a backlight unit 609a, a timer circuit 610 and a synchronizing signal generator circuit 611.

An operation of the LCD device of FIG. 6 is described.

Continuous image data are input to the VRAM input selector 601 from a MPU bus connected with a MPU (not shown). An even frame image is stored in the VRAM 602, and an odd frame image is stored in the VRAM 603.

The image data stored in the VRAMs 602 and 603 are input to the comparator circuit 606 and the VRAM output selector 604. The VRAM output selector 604 is a circuit for alternately reading out the image data from VRAMs 602 and 603 in response to a data readout signal from the LCD controller 608.

The comparator circuit 606 is the same structure as the comparator circuit 304 and is shown in FIG. 5. Two frame image data (in bit units) read out from the VRAMs 602 and 603 are compared with each other by the comparators 501a and 502b. In the comparators 501a and 501b, when two image data signals coincide with each other, a low level (L) signal is output, and when the two image data signals are different from each other, a high level (H) signal is output. Two output signals are synchronized with a standard clock by the flipflop circuits 503a and 503b and output through the delay circuits 504a and 504b for comparator circuit delay.

By the above operation, a level whether or not two frame images coincide with each other can be determined.

Output signals from the comparator circuit 606 are input to the synchronizing signal regulator circuit 607. As shown in FIG. 6, an AND logic operation between the output signal from the circuit 606 and horizontal and vertical synchronizing signals from the synchronizing signal generator circuit 611 is performed in the AND circuits 607.

As described above, when two image data signals coincide with each other, a low level (L) signal is output from the comparator circuit 606. Therefore, when an AND logic operation is performed in the AND circuits 607, the horizontal and vertical synchronizing signals are not output from the AND circuits 607 to the LCD controller 608. Only vertical synchronizing signal may be not output.

On the other hand, when the two image data signals are different from each other, a high level (H) signal is output from the comparator circuit 606. Therefore, when an AND logic operation is performed in the AND circuits 607, the horizontal and vertical synchronizing signals are output from the AND circuits 607 to the LCD controller 608.

In either of the above states, the horizontal and vertical synchronizing signals are input to the LCD unit 609 through the LCD controller 608.

When two image data coincide with each other, the timer circuit 610 starts count and horizontal and vertical synchronizing signals are maintained at the same state until a count value of the timer circuit 610 reaches a set value. The timer circuit 610 is connected with the comparator circuit 606 through an interruption signal line 620. When the count value of the timer circuit 610 reaches the set value, an interruption signal output from the timer circuit 610 changes an output signal level of the comparator circuit 606 into a high level (H).

Also, when the two image data coincide with each other, since the timer circuit 610 is connected with the LCD unit 609 through a backlight unit switch line 621, the timer circuit 610 outputs a signal (having a level for turning off the backlight unit 609*a*) to the backlight unit switch line 621 after a count value of the timer circuit 610 reaches an initial set value, so that the backlight unit 609*a* of the LCD unit 609 can be turned off. When the timer circuit 610 is reset, the level of the signal on the backlight unit switch line 621 is held to a level for turning on the backlight unit 609*a*.

By the above operations, when the same frame images are continuous, turning on and off of the backlight unit 609*a* can be controlled.

According to the present invention, when the same frame images are continuous, synchronizing signals (or only vertical synchronizing signal) are not output to a liquid crystal display device. As a result, the number of scannings of frames to be displayed on the liquid crystal display device is decreased and the backlight unit is turned off, so that consumption power of the liquid crystal display device can be reduced.

What is claimed is:

1. An electro-optical device comprising:
   display portion;
   at least one video random access memory for storing at least continuous first and second frame data;
   comparing means for comparing the first frame data with the second frame data;
   output means for selectively outputting at least a vertical synchronizing signal in accordance with a comparison result of the comparing means; and
   control means for reading out the frame data from the video random access memory and controlling the display portion in accordance with the selectively output vertical synchronizing signal, to display the read out frame date on the display portion.

2. A device according to claim 1 further comprising a timer for outputting an interrupting signal to the comparing means when a count value reaches a desired value to be set, wherein when the second frame data coincides with the first frame date, counting of the count value is started.

3. A device according to claim 2 further comprising a backlight unit, wherein when the second frame data coincides with the first frame data, the timer turns off the backlight unit.

4. A device according to claim 3 wherein when the second frame data is different from the first frame data, the timer turns on the backlight unit.

5. A device according to claim 1 wherein the video random access memory has parallel input and output ports and serial input and output ports.

6. A device according to claim 1 wherein said electro-optical device comprises a liquid crystal display device.

7. An electro-optical device comprising:
   a display portion;
   at least one video random access memory for storing at least continuous first and second frame data;
   comparing means for comparing the first frame data with the second frame data when the first frame data is displayed on the display portion;
   output means for selectively outputting at least a vertical synchronizing signal in accordance with a comparison result of the comparing means; and
   control means for reading out the frame data from the video random access memory and controlling the display in accordance with the selectively output vertical synchronizing signal,
      wherein the second frame data is displayed on the display portion when the second frame data is different from the first frame data.

8. A device according to claim 7 wherein the video random access memory has parallel input and output ports and serial input and output ports.

9. A device according to claim 7 wherein said electro-optical device comprises a liquid crystal display device.

10. An electro-optical device comprising:
    a display portion;
    at least one video random access memory for storing at least continuous first and second frame data;
    comparing means for comparing the first frame data with the second frame data when the first frame data is displayed on the display portion;
    output means for selectively out putting at least a vertical synchronizing signal in accordance with a comparison result of the comparing means; and
    control means for reading out the frame data from the video random access memory and controlling the display portion in accordance with the selectively output vertical synchronizing signal,
       wherein the comparing means outputs a level signal when the second frame data is different from the first frame data, and the output means outputs the vertical synchronizing signal in accordance with the output level signal.

11. A device according to claim 10 wherein the video random access memory has parallel input and output ports and serial input and output ports.

12. A device according to claim 10 wherein said electro-optical device comprises a liquid crystal display device.

13. An electro-optical device comprising:

a display portion;

at least one video random access memory storing at least continuous first and second frame data;

comparing means for comparing the first frame data with the second frame date when the first frame data is displayed on the display portion and outputting a level signal when the second frame data is different from the first frame data;

output means for outputting at least a vertical synchronizing signal in accordance with the output level signal;

control means for reading out the frame data from the video random access memory and controlling the display portion in accordance with the output vertical synchronizing signal; and a timer, including a counter, for outputting an interrupting signal to the comparing means when a count value reaches a desired value to be set, wherein when the second frame data coincides with the first frame data, counting of the count value is started, and when the comparing means receives the interrupting signal, the comparing means outputs the level signal and the count value of the timer is reset.

14. A device according to claim 13 wherein the display portion further includes a liquid crystal, and the desired value is set in accordance with a characteristic of the liquid crystal without applying an alternating voltage to the liquid crystal.

15. A device according to claim 13 wherein the display portion further includes an analog memory, and the desired value is set to a time shorter than a refreshing time of the analog memory.

16. A device according to claim 13 wherein the video random access memory has parallel input and output ports and serial input and output ports.

17. An electro-optical device comprising:

a display portion including a matrix circuit;

a driver circuit for driving the display portion; and a control portion for controlling the driver circuit;

wherein the control portion comprises, at least one video random access memory for storing at least continuous first and second frame data;

a comparator for comparing the first frame data with the second frame data;

a generator for selectively outputting at least vertical synchronizing signal in accordance with a comparison result of the comparator; and a controller for reading out the frame data from the video random access memory receiving the selectively output vertical synchronizing signal from the generator, and outputting the frame data and the received vertical synchronizing signal to the driver circuit, to display the frame data on the display portion.

18. A device according to claim 17 wherein when the second frame data is different from the first frame data, the generator outputs the vertical synchronizing signal.

19. A device according to claim 17 further comprising a timer for outputting an interrupting signal to the comparator when a count value reaches a desired value to be set, wherein when the second frame data coincides with the first frame data, counting of the count value is started.

20. A device according to claim 17 further comprising a backlight unit, wherein when the second frame data coincides with the first frame data, the timer turns off the backlight unit.

21. A device according to claim 17 wherein when the second frame data is different from the first frame data, the timer turns on a backlight unit.

22. A device according to claim 17 wherein the display portion further includes an analog memory, and the desired value is set to a time shorter than a refreshing time of the analog memory.

23. A device according to claim 17 wherein said video random access memory has parallel input and output ports and serial input and output ports.

24. A device according to claim 17 wherein said electro-optical device is liquid crystal display device.

25. An electro-optical device comprising:

a display portion including a liquid crystal;

at least one video random access memory for storing first and second frame data representing currently displayed data and data to be displayed, respectively;

control means connected to said video random access memory for reading out the frame data from the video random access memory and for controlling the display portion in response to a synchronizing signal input to display the read out frame data on the liquid crystal;

data arranging means connected to the video random access memory for providing an arrangement of the first and second frame data facilitating comparisons between the first and second frame data;

timing means for generating a refresh signal at a preset interval representing a desired maximum period between updates of the display portion;

data comparing means connected to the data arranging means and the timing means, for accessing the frame data, performing a comparison between the first frame data and the second frame data, and generating a control signal either (1) when the first frame data is different from the second frame data or (2) when said refresh signal is received from the timing means;

synchronizing signal generating means for periodically generating at least a vertical synchronizing signal output;

synchronizing signal regulating means connected to said synchronizing signal generating means, said data comparing means, and said control means for receiving said synchronizing signal output of the synchronizing signal generating means and said control signal of said data comparing means, and for selectively transmitting said synchronizing signal output to said synchronizing signal input of said control means when said control signal indicates that either (1) the first frame data is different from the second frame data or (2) the desired maximum period between updates of the display potion has elapsed, whereby power consumption of the display device is reduced at times when no change is desired in the currently displayed data, by dynamically increasing a period between consecutive scans of the liquid crystal to said desired maximum period.

* * * * *